US010929562B2

(12) United States Patent
Orner et al.

(10) Patent No.: US 10,929,562 B2
(45) Date of Patent: Feb. 23, 2021

(54) METHOD AND APPARATUS FOR SECURING RESTING DATA IN INTERNET CONNECTED DEVICES

(71) Applicant: Samsung Electronics Co., Ltd., Suwon-si (KR)

(72) Inventors: Bret Alan Orner, Arlington, MA (US); Enyang Huang, Andover, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 16/013,357

(22) Filed: Jun. 20, 2018

(65) Prior Publication Data

US 2018/0373892 A1    Dec. 27, 2018

Related U.S. Application Data

(60) Provisional application No. 62/524,693, filed on Jun. 26, 2017.

(51) Int. Cl.
| | |
|---|---|
| *H04L 9/00* | (2006.01) |
| *G06F 21/62* | (2013.01) |
| *H04L 9/08* | (2006.01) |
| *H04L 29/06* | (2006.01) |

(52) U.S. Cl.
CPC ...... *G06F 21/6263* (2013.01); *G06F 21/6209* (2013.01); *H04L 9/0819* (2013.01); *H04L 9/0866* (2013.01); *H04L 63/0435* (2013.01); *H04L 63/06* (2013.01); *H04L 63/18* (2013.01); *H04L 63/08* (2013.01); *H04L 2209/805* (2013.01)

(58) Field of Classification Search
CPC .................................................. G06F 21/6263
See application file for complete search history.

(56) References Cited

U.S. PATENT DOCUMENTS

| | | | |
|---|---|---|---|
| 2005/0204405 A1* | 9/2005 | Wormington | G06Q 30/02 726/27 |
| 2007/0101158 A1* | 5/2007 | Elliott | G06F 21/79 713/193 |
| 2013/0156196 A1* | 6/2013 | Jogand-Coulomb | G06F 21/10 380/278 |
| 2014/0082373 A1* | 3/2014 | Colnot | G06F 21/575 713/193 |
| 2015/0006907 A1* | 1/2015 | Brouwer | H04L 9/0838 713/189 |
| 2015/0278495 A1* | 10/2015 | Yu | G06F 21/32 713/186 |

* cited by examiner

*Primary Examiner* — Josnel Jeudy
(74) *Attorney, Agent, or Firm* — Jefferson IP Law, LLP

(57) ABSTRACT

An electronic device for securing information, and a method therefor are provided. The electronic device includes a receiver for receiving an encrypted data from a server, the encrypted data being encrypted with an encryption key by a key cryptography based on a private information, a nonvolatile memory for storing the encrypted data, a decryptor for receiving the encrypted data from the nonvolatile memory, decrypting the encrypted data into an unencrypted data including the private information, and a volatile memory for storing the unencrypted data. The receiver authenticates a communication channel and receives the encryption key through the authenticated communication channel, and the decryptor receives the encryption key from the receiver and decrypts the encrypted data with the encryption key.

15 Claims, 3 Drawing Sheets

METHOD AND APPARATUS FOR SECURING RESTING DATA IN INTERNET CONNECTED DEVICES

CROSS-REFERENCE TO RELATED APPLICATION(S)

This application is based on and claims priority under 35 U.S.C. § 119(e) of a U.S. Provisional application Ser. No. 62/524,693, filed on Jun. 26, 2017, in the U.S. Patent and Trademark Office, the disclosure of which is incorporated by reference herein in its entirety.

BACKGROUND

1. Field

The present disclosure relates to data protection, such as protection of personal data on the Internet.

2. Description of the Related Art

Traditionally secure data can only be stored on secure elements, or crypto authentication devices such as Atmels ECC508 (http://www.atmel.com/products/security-ics/cryptoauthentication/ecc-256.aspx).

These devices have specific security elements in place to prevent physical attacks, such as a metal mesh built into the silicon die of the memory which obfuscates the electrical signals while also providing tamper protection against any unauthorized physical access, for example through chip decapping. Chip decapping is the process of removing the plastic/epoxy body protecting the underlying silicon chip in order to get physical access to the internal components (e.g. silicon die) within the packaging of the device. This allows direct access to the embedded memories and bus.

With a new generation of cost sensitive internet connected devices around us, for example in relation to the Internet of Things (IOT), devices are constantly collecting and storing data. The secure storage of this data becomes burdensome. Typically, "low end" off the shelf processors (where low end is any typical Microcontroller (MCU), not an applications microprocessor such as what is in a cell phone) are favored, due to their ease of availability, low cost and broad support. However, there are currently no "low end" MCUs which offer any type of physical security. When data contains personal information, such as credit card numbers, it can become quite enticing and potentially valuable to the point at which an attacker could be motivated to decap an embedded memory or MCU and use specialized but readily available tools to read out the information for malicious use.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for illustrating a secure storage of data on internet connected devices that may store data susceptible of nefarious access.

A device, system and method are disclosed that facilitate secure storage of data on internet connected devices that may store data susceptible of nefarious access (such as devices on the IOT storing personal information). The device, system and method involve a receiver receiving encrypted data from a server, the encrypted data being encrypted with an encryption key by key cryptography based on some element of private information. A nonvolatile memory is used for storing the encrypted data. A decryptor may be interconnected and receives the encrypted data from the nonvolatile memory and decrypts the encrypted data into an unencrypted data including the private information. A volatile memory may store the unencrypted data. The receiver authenticates a communication channel and receives the encryption key through the authenticated communication channel, and the decryptor receives the encryption key from the receiver and decrypts the encrypted data with the encryption key.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The present disclosure is described with respect to particular exemplary embodiments thereof and reference is accordingly made to the drawings in which.

Throughout the drawings, it should be noted that like reference numbers are used to depict the same or similar elements, features, and structures.

DETAILED DESCRIPTION

Figure 1:
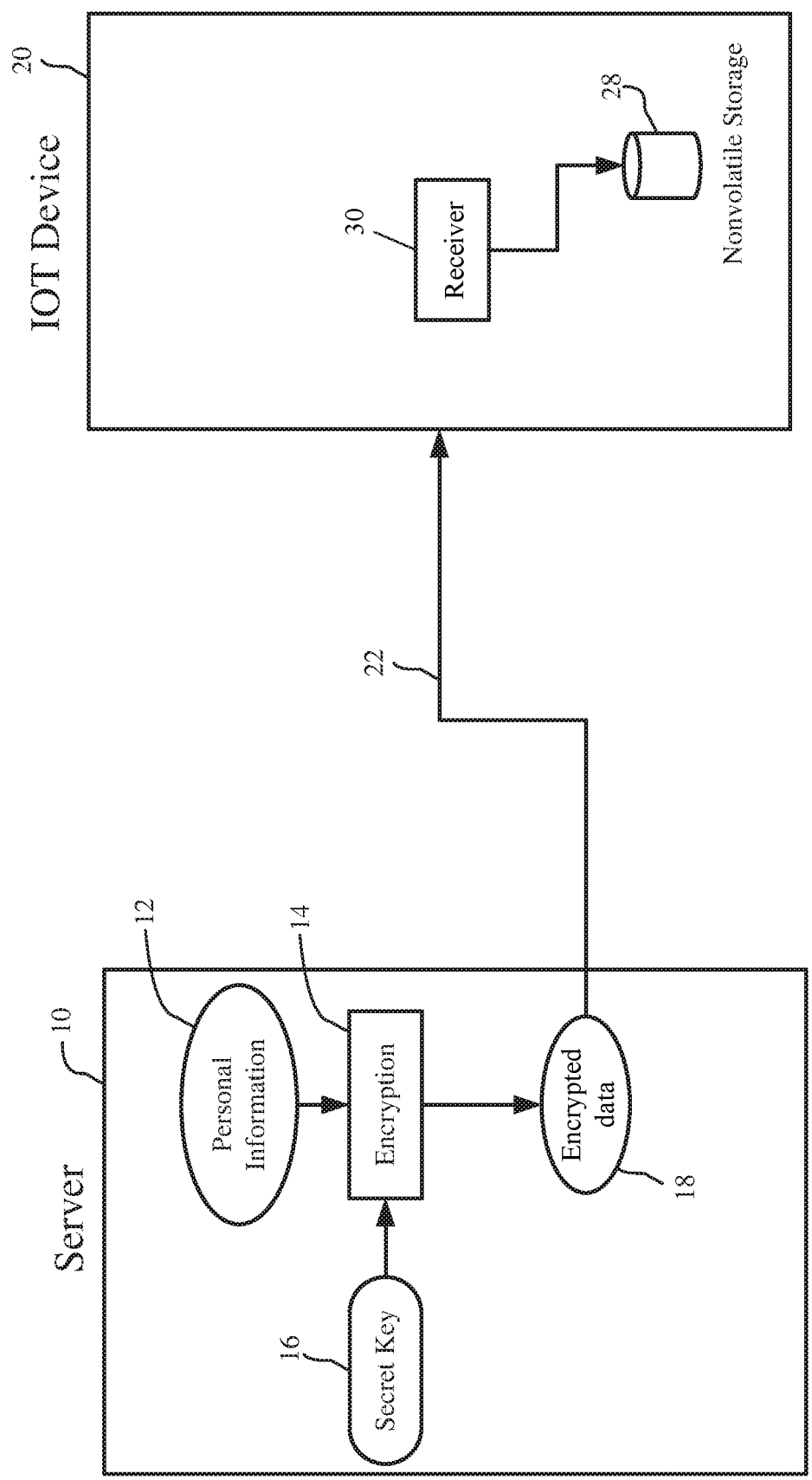
FIG. 1 is a block diagram illustrating a device, system and method disclosed that facilitate secure storage of data on internet connected devices according to the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

With the addition of an internet connection a new system and method of security for MCU's of cost sensitive internet connected devices that may not offer any type of physical security can be introduced, using symmetrical key cryptography algorithms and remotely stored symmetrical keys which are transmitted using a secure channel.

Any personal information can be stored in unsecured non-volatile memory by first being encrypted, this would make any effort to decap an embedded memory or MCU much more challenging since any data read out would be ciphertext (i.e. encrypted data), and, with a strong enough algorithm, it may not be computationally feasible to decrypt.

When personal information is required for the operation of the system, the encrypted personal data can be decrypted with a key stored on a remote server into its usable cleartext (i.e. unencrypted) representation. When personal information is needed the key can be retrieved through an authenticated, secure internet connection, e.g. via a mobile wallet application using a valid server credential. Once the key has been securely retrieved, it will be stored in volatile memory inside or associated with the MCU. The contents of volatile memory are susceptible to any fluctuations in its power supply, meaning the key value cannot be maintained through a low/unstable voltage condition and will be overwritten in a reset condition. Any unencrypted personal data will also only be available in volatile memory, subject to the same constraints. Once relevant information has been used it can easily be erased along with the key, or erased after a predetermined timeout (e.g. based on timeout logic). The system and method according to the disclosure solves the Data-at-Rest security problem because, a malicious attacker not only needs to perform decapping of a MCU (which requires physical possession), but would also need to crack the owner's online identity and credential. This dramatically increases the complexity and cost for any attack aimed at recovering sensitive information stored within a MCU.

The current state of the art for decapping chips is already extremely error prone when only removing the housing and attempting to read out any stored data without damaging the silicon die. By one estimate, the success rate of decapping a packaged device without compromising the silicon is approximately 33%. Typically, this is done by first removing the chip from its circuit board (PCBA) and either removing the housing with caustic chemicals or through mechanical abrasion.

Use of encrypted data, with a key stored in volatile memory further complicates the process, or makes it impossible with current techniques. Due to the key's presence in volatile memory it is necessary to keep the MCU powered through the entire decapping process, greatly increasing the difficulty of successfully performing the decapping operation. It would also be quite easy to damage or unknowingly change the contents of the volatile memory during the process.

As illustrated in FIG. 1, according to the disclosure, a server 10 receives or generates personal information 12. The generated or received personal information 12 is encrypted 14 using a symmetric encryption algorithm, such as AES. Symmetric algorithms for cryptography use the same cryptographic keys for both encryption of plaintext and decryption of cipher text. The keys may be identical or there may be a simple transformation to go between the two keys. The key(s), in practice, represent a shared secret between two or more parties that can be used to maintain a private information link.

In an illustrative embodiment, encryption may be effected using a secret key 16, such as a randomly generated 128-bit value. The encryption key 16 may be based on some element of private information or a unique credential 12. The produced cipher text 18 is sent to an Internet connected (IOT) device 20 for consumption, where it is received by a receiver 30 and stored in its encrypted format, for example in non-volatile storage 28. The encryption key 16 may be sent to the IOT device 20 by way of an authenticated channel 22 for decryption of the encrypted data 18. For example, when a credit card number is needed for a payment, it would be encrypted so it can be securely transmitted and stored in the IOT device 20. For example, an IOT device 20 may choose to store personal information 12 to accomplish certain tasks, this data may be encrypted on a server 10 prior to storing on the IOT device 20 to ensure security of the information and decrypted only when the information is needed by way of the encryption key 16 stored on the server 10 and transmitted over an authenticated channel 22.

Figure 2:
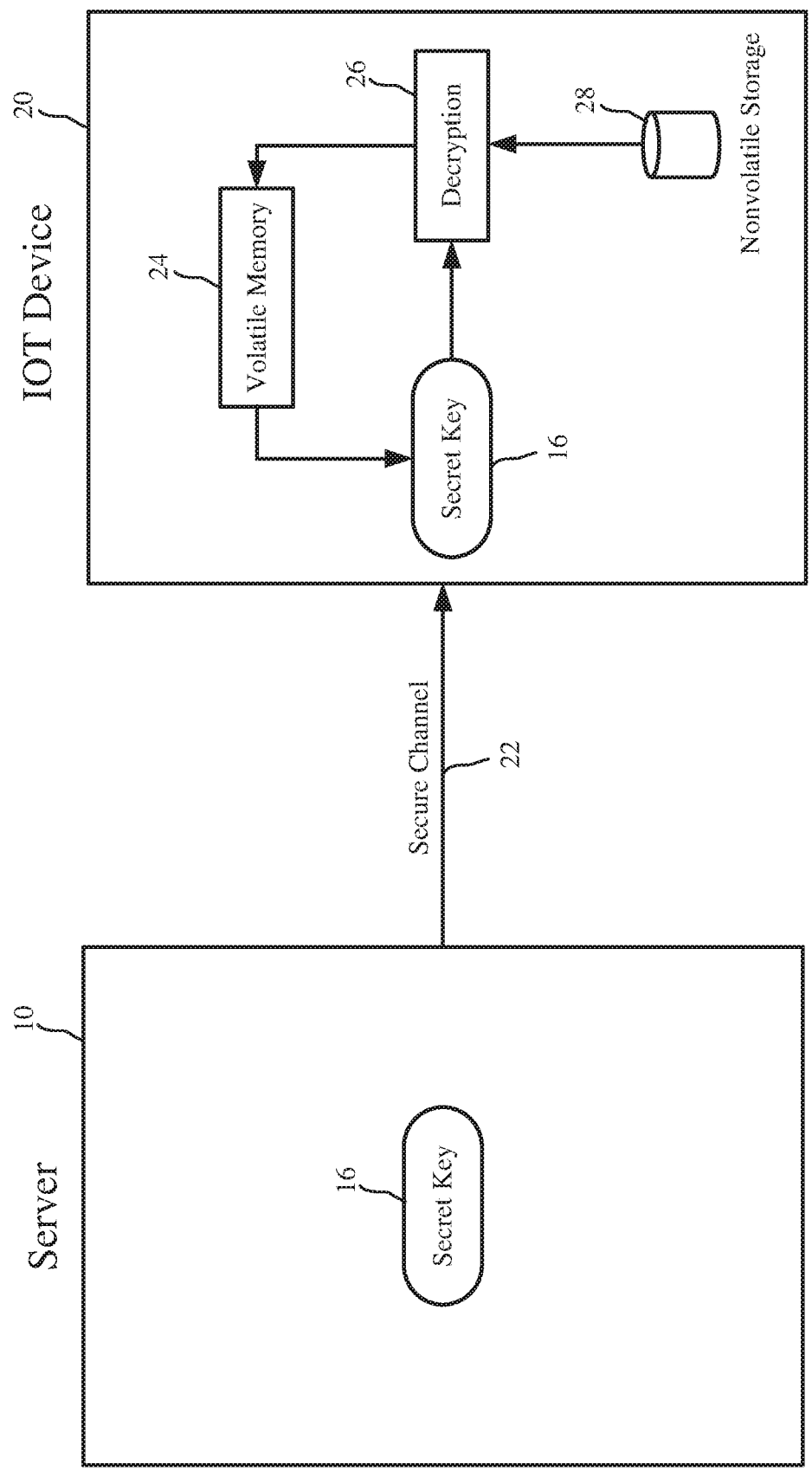
FIG. 2 is a further block diagram illustrating the device, system and method disclosed that facilitate secure storage of data on internet connected devices according to the disclosure.

As illustrated in FIG. 2, when the personal information 12 needs to be consumed (i.e. used in its unencrypted state) the shared secret key 16 can be transmitted over a secure channel 22, using standard transport layer security (TLS) as known in the art, to the IOT device 20. The TLS secure channel 22 between server 10 and IOT device 20 effectively provides a second layer of security for the already secure ciphertext stored private information 18 stored in the IOT device 20. The TLS protocol aims primarily to provide privacy and data integrity between the server 10 and IOT device 20.

The TLS handshake protocol is responsible for the authentication and key exchange necessary to establish or resume secure sessions. When establishing a secure session, the protocol manages the communication of encrypted data 18 between the server 10 and IOT device 20 throughout message exchange. The TLS protocol effects identification/authentication of the server 10 to the IOT device 20. Optionally, the IOT device 20 might also need to prove its identity to the server 10. Key information exchange is effected via the TLS protocol to establish the secure channel 22. For example, the IOT device 20 and server 10 may exchange random numbers and a special Pre-Master Secret number. These numbers may be combined with additional data permitting the IOT device 20 and server 10 to create a shared secret in implementing the secure channel 22.

Referring still to FIG. 2, instrumental in the secure channel 22 communication, a valid server credential (signed by the server's private key in effecting the secure channel) is passed over the channel 22 between the IOT device 20 and the server 10, to retrieve the secret key 16 from the server 10. The IOT device 20 upon receiving the secret key 16, stores this key 16 in volatile memory 24. The secret key 16 can then be retrieved from volatile memory 24 so the IOT device 20 can use it as an input to a decryption algorithm 26. Encrypted data 18 (i.e. the personal/private information) may be stored in the IOT device 20 in nonvolatile storage 28.

The encrypted data 18 may be decrypted from the nonvolatile memory 28 into the volatile memory 24 where it can be consumed, and easily destroyed along with the key 16.

According to the disclosure, an attacker without knowledge of user's server credential could not authenticate the server 10 in order to communicate across the secure channel 22 and thus cannot obtain the secret key 16 from the server 10. Further, according to the disclosure it is infeasible to attack the IOT device(s) 20 and recover the nonvolatile storage content (28).

Figure 3:
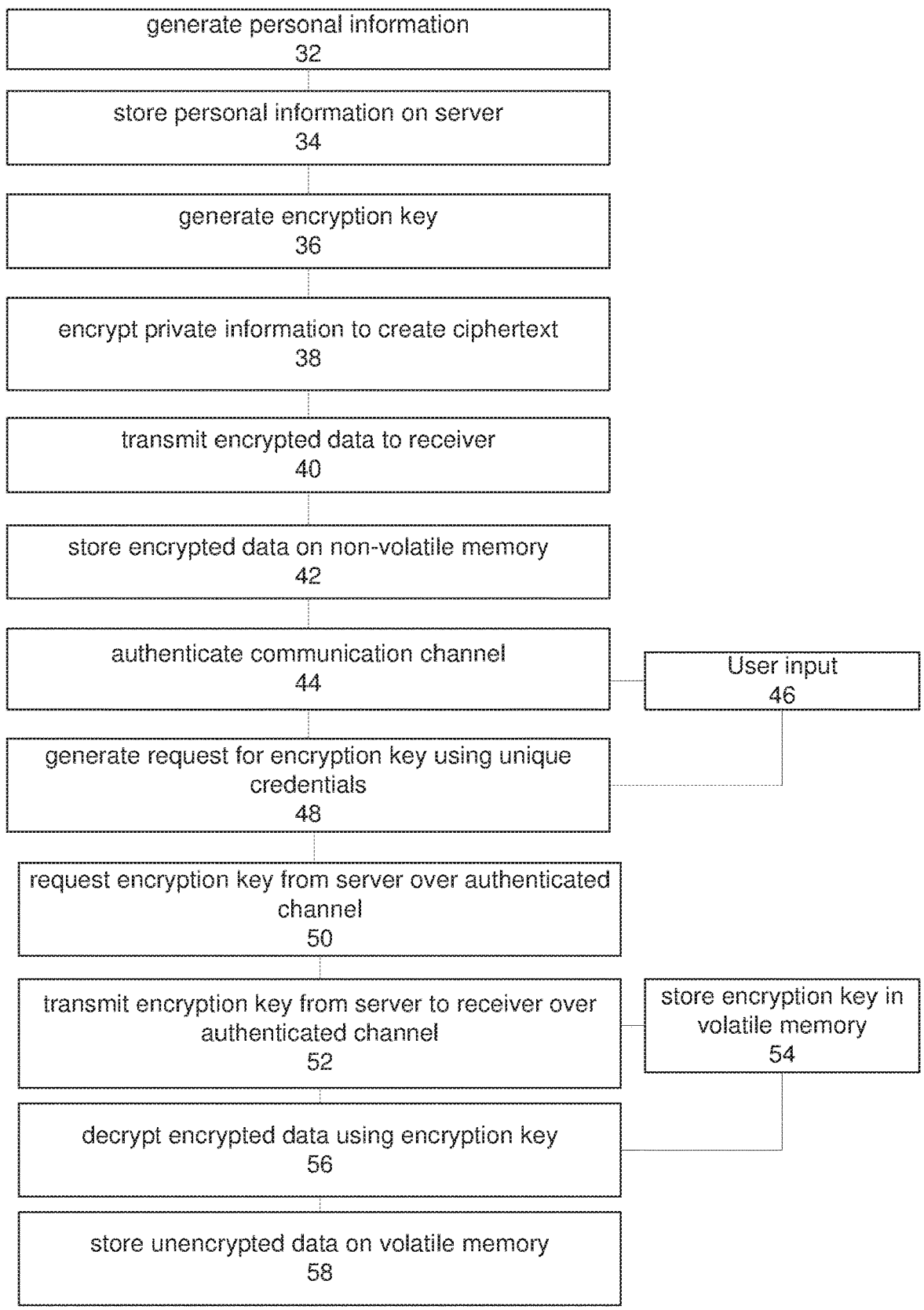
FIG. 3 is a flow chart illustrating the device, system and method disclosed that facilitate secure storage of data on internet connected devices according to the disclosure.

As illustrated in FIG. 3, when personal information is generated at operation 32, it may be stored at operation 34 on a server 10. This personal information 12 may be encrypted at operation 38 to create encrypted data 18 using an encryption key 16 which may be generated at operation 36 through the use of the personal information or a unique credential 12. The encrypted data 18 may be transmitted at operation 40 to a receiver 30. The receiver 30 may store, at operation 42, the encrypted data 18 in non-volatile storage 28. The receiver 30 may authenticate, at operation 44, an authenticated communication channel 22 with the server 10. A request for the encryption key 16 may be generated at operation 48 by the IOT 20 or by user input 46. The request may be generated using a server credential which allows the server to validate the request. The request is sent, at operation 50, to the server 10 to request the encryption key 16 from the server 10 through the authenticated communication channel 22. The server 10 transmits, at operation 52, the encryption key 16 to the receiver 30 through the authenticated communication channel 22. The receiver 30 may store, at operation 54, the encryption key 16 in the volatile memory 24 of the IOT 20. The encrypted data 18 is decrypted, at operation 56, using the encryption key 16. The unencrypted data 12 may be stored, at operation 58, in the volatile memory 24 of the IOT 20.

It will be appreciated that various embodiments of the disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the disclosure.

Any such software may be stored in the form of volatile or non-volatile storage such as, for example, a storage device like a read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a receiver;
   a nonvolatile memory;
   a processor; and
   a volatile memory,
   wherein the processor is configured to:
   authenticate, using the receiver, a communication channel with a remote server,
   receive, using the receiver, an encryption key via the authenticated communication channel from the remote server,
   store the encryption key in the volatile memory,
   receive, using the receiver, encrypted data being encrypted with the encryption key from a server,
   store the encrypted data in the nonvolatile memory, and
   decrypt the encrypted data into unencrypted data using the encryption key and store the unencrypted data in the volatile memory.

2. The electronic device in claim 1, wherein the encryption key and the encrypted data are stored only in the volatile memory.

3. The electronic device in claim 1, further comprising:
   a transmitter for transmitting a request for the encryption key in response to a user input.

4. The electronic device in claim 1, further comprising:
   a key cryptography based on a unique credential comprising private information.

5. A method of securing private information in an internet connected electronic device, the method comprising:
   receiving an encrypted data from a server, the encrypted data being encrypted with an encryption key by a key cryptography based on a private information;
   storing the encrypted data in a nonvolatile memory;
   authenticating a communication channel;
   receiving the encryption key through the authenticated communication channel;
   storing the encryption key in a volatile memory of the electronic device;
   decrypting the encrypted data stored in the nonvolatile memory using the encryption key into an unencrypted data including the private information; and
   storing the unencrypted data in a volatile memory.

6. The method of claim 5, further comprising:
   generating the private information in response to a user input.

7. The method of claim 5, further comprising:
   generating the encryption key using a unique credential created using the private information.

8. The method of claim 5, wherein the encryption key is generated using the private information generated by a user input.

9. The method of claim 5, further comprising:
   generating a request for the encryption key using a unique credential.

10. A method of securing personal information in an internet connected electronic device, the method comprising:
    generating a personal information;
    storing the personal information on a server;
    generating an encryption key with a key cryptography at the server;
    encrypting the personal information using the encryption key to create an encrypted data at the server;

transmitting the encrypted data to an internet connected device;

storing the encrypted data on a nonvolatile memory of the internet connected device;

generating a request for the encryption key at the internet connected device;

transmitting the request for the encryption key to the server;

receiving the encryption key from the server at the internet connected device;

storing the encryption key in a volatile memory of the internet connected device;

decrypting the encrypted data using the encryption key into an unencrypted data including the personal information at the internet connected device; and storing the personal information on the volatile memory of the internet connected device.

11. The method of claim 10, further comprising:

generating the encryption key with a key cryptography based on a unique credential at the server.

12. The method of claim 10, further comprising:

authenticating a communication channel between the server and the internet connected device.

13. The method of claim 10, further comprising:

receiving a user input for generating the request for the encryption key.

14. The method of claim 10, further comprising:

generating the request for the encryption key using a unique credential.

15. The method of claim 10, further comprising:

receiving a user input for generating the personal information at the internet connected device.

* * * * *